No. 863,811. PATENTED AUG. 20, 1907.
E. M. SPRICH.
RACE STARTING GATE.
APPLICATION FILED NOV. 28, 1906.
3 SHEETS—SHEET 1.
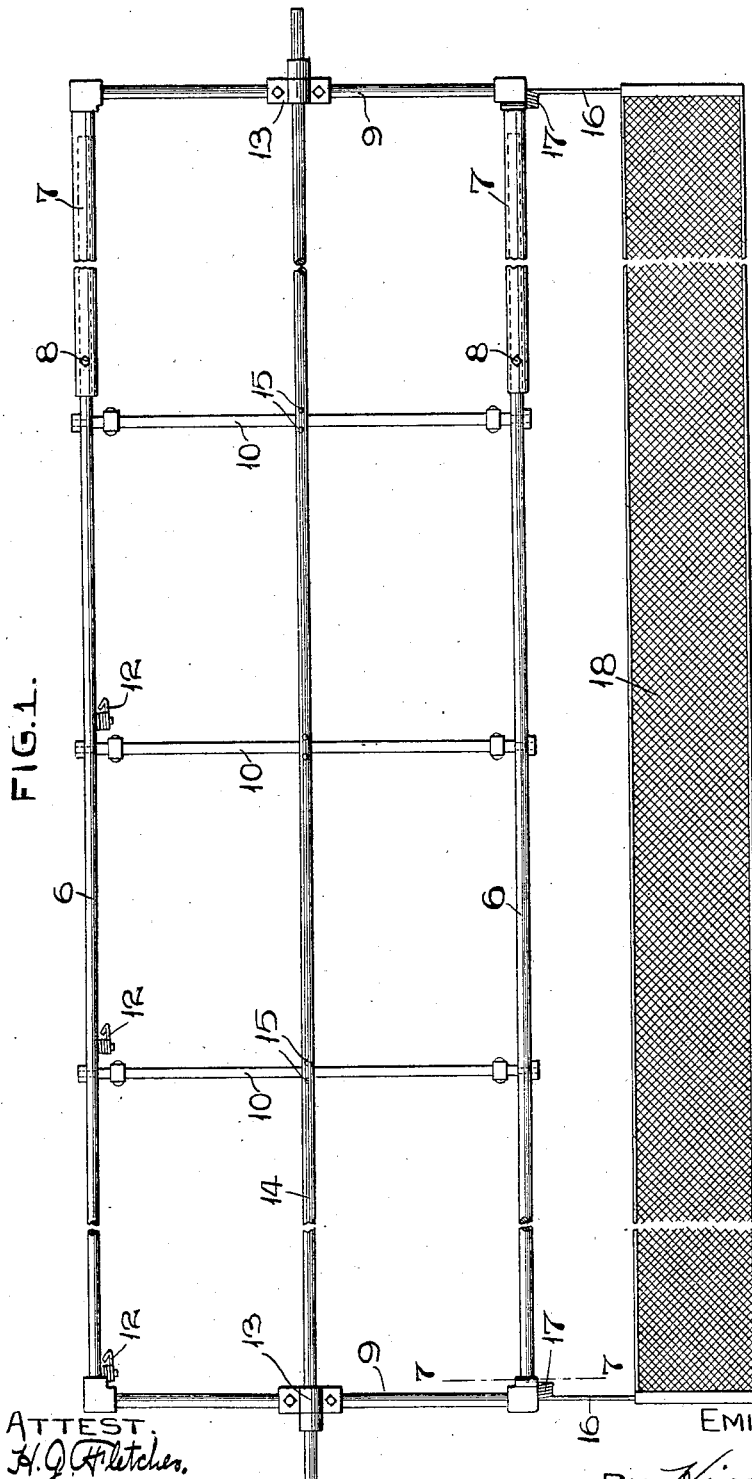
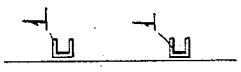
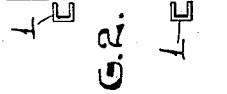
INVENTOR.
EMIL M. SPRICH.
ATTEST.
BY
ATTY'S.

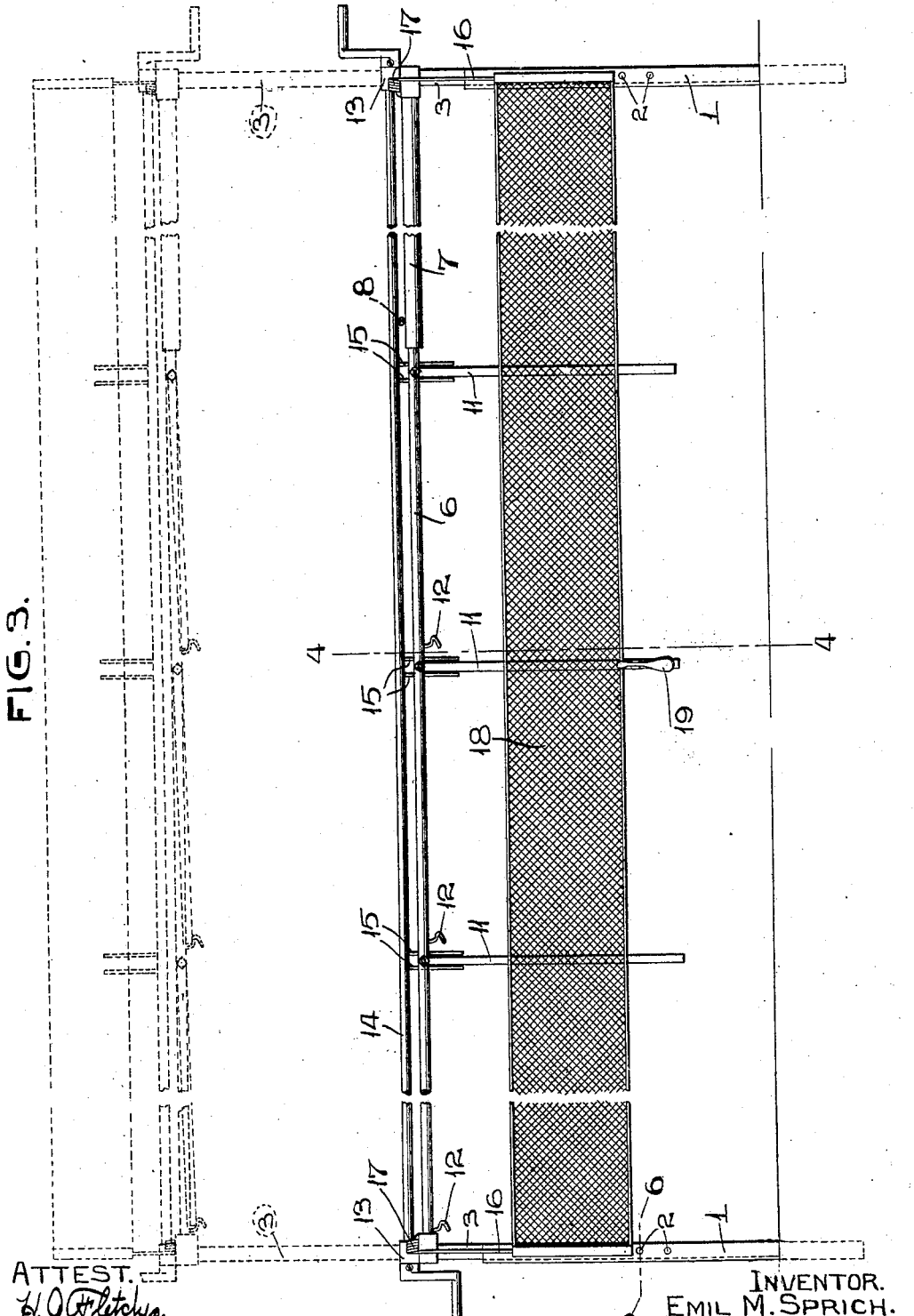

No. 863,811. PATENTED AUG. 20, 1907.
E. M. SPRICH.
RACE STARTING GATE.
APPLICATION FILED NOV. 28, 1906.
3 SHEETS—SHEET 3.
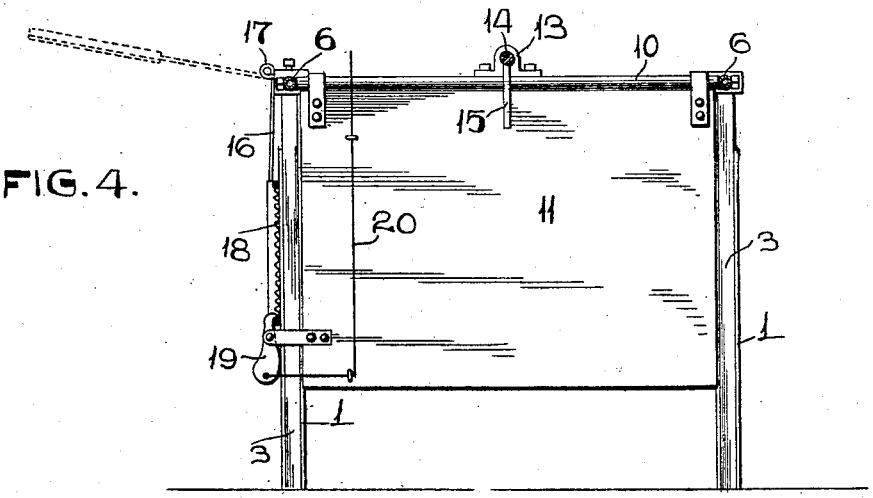
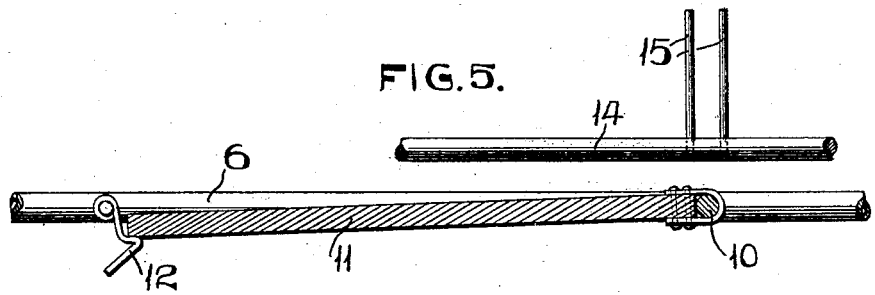
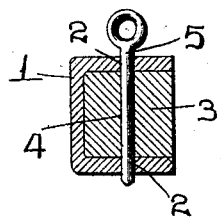
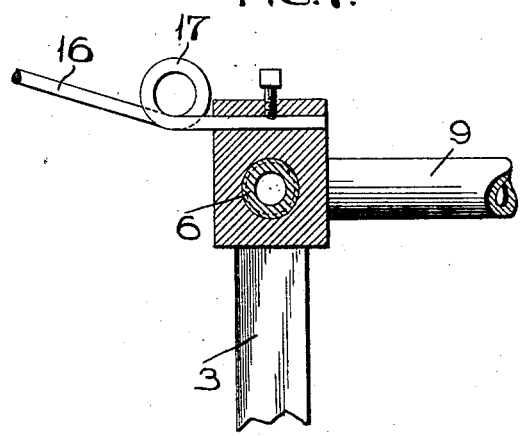
ATTEST.
H. J. Fletcher.
M. P. Smith
INVENTOR.
EMIL M. SPRICH.
BY Rigdon & Longan
ATT'Y'S
THE NORRIS PETERS CO., WASHINGTON, D. C.

UNITED STATES PATENT OFFICE.

EMIL M. SPRICH, OF ST. LOUIS, MISSOURI, ASSIGNOR OF ONE-THIRD TO CHESTER STEBBINS, OF ST. LOUIS, MISSOURI.

RACE-STARTING GATE.

No. 863,811.  Specification of Letters Patent.  Patented Aug. 20, 1907.

Application filed November 28, 1906. Serial No. 345,560.

*To all whom it may concern:*

Be it known that I, EMIL M. SPRICH, a citizen of the United States, and a resident of St. Louis, Missouri, have invented certain new and useful Improvements in Race-Starting Gates, of which the following is a specification containing a full, clear, and exact description, reference being had to the accompanying drawings, forming a part hereof.

My invention relates to a race starting gate, the object of my invention being to provide a simple apparatus which is transversely arranged across the track of a race course, and intended to insure an even start for all the contestants in a race.

To the above purposes, my invention consists in certain novel features of construction and arrangement of parts, which will be hereinafter more fully set forth, pointed out in the claims, and illustrated in the accompanying drawings, in which:—

Figure 1 is a plan view of a starting gate of my improved construction, with the barrier thereof elevated; Fig. 2 is a diagrammatic plan view showing a short section of a race course, with the posts arranged to receive my improved starting gate; Fig. 3 is a front elevation of the gate with the barrier lowered, and dotted lines showing the gate elevated so as to allow the contestants to pass thereunder after completing the circuit of the race course; Fig. 4 is a vertical section taken on the line 4—4 of Fig. 3; with dotted lines showing the barrier elevated; Fig. 5 is a detail section of one of the swinging partitions of the gate, and showing the same swung upwardly and suspended; Fig. 6 is an enlarged horizontal section taken on the line 6—6 of Fig. 3; Fig. 7 is an enlarged detail section taken on the line 7—7 of Fig. 1.

The posts 1 which support my improved gate are arranged in pairs on opposite sides of the track wherever it is desired to make a start, said posts being in the form of channel irons, and formed through the sides of said channel irons are the pairs of horizontally alined apertures 2. It is necessary that these posts be very firmly anchored in the ground in order that they may support the weight of the corner posts of the gate, and the open sides of the channel irons forming each set of the posts all face the same way in order that the gate proper may be quickly detached and moved away from said posts.

The gate proper comprises four vertically disposed corner posts 3, through each of which is formed a horizontally arranged aperture 4, and adapted to pass through said apertures and through the pairs of apertures 2 to lock the posts 1 and 3 together are pins 5.

Rigidly fixed in any suitable manner to one pair of the posts 3 is a pair of horizontally extending parallel rods 6; and fixed to the upper ends of the opposite pair of posts are the horizontally arranged parallel tubular members 7, into which the ends of the rods 6 telescope, and which rods are locked to the tubuar members by means of set screws 8. Connecting the upper ends of each pair of posts 3 at the ends of the gate are the end rods 9. This arrangement forms the frame work of the gate which is removably connected to and vertically adjustable in the corner posts 1.

Transversely arranged between the rods 6, at suitable distances apart, are rods 10, on each of which is hinged a depending partition 11; and when all of the partitions are swung downwardly into their normal positions, a row of stalls or compartments is formed beneath the frame work of the gate. All of these partitions 11 are adapted to be swung upwardly into a horizontal plane, and, when so arranged, they are engaged and held in such positions by spring catches 12, which are fixed to one of the rails 6.

Arranged on top of the end rails 9 are journal boxes 13, in which is arranged for rotation a shaft 14, and formed on or fixed thereto are the pairs of fingers 15 which are so spaced as that they engage over the upper edge of each of the partitions 11 when the latter are in their normal vertical positions, thus preventing said partitions from being swung in either direction when the stalls between said partitions are occupied by the contestants of the race. When the shaft 14 is partially rotated, the pairs of fingers are swung upwardly away from the upper edge of the partitions, and this permits said partitions to be swung upwardly into horizontal planes and engaged by the catches 12.

Fixed to the upper ends of the front pair of posts 3 are the rear ends of springs 16, which are formed into coils 17 immediately in front of the front rod 6, and the opposite ends of said springs are extended and united to the ends of a suitable barrier 18, which is of sufficient length to extend entirely across the front of the frame work of the gate. The normal tendency of the springs 16 maintains the barrier in an elevated position, as seen by dotted lines in Fig. 4, and when said barrier is swung downwardly in front of the stalls formed by the partitions 11, the lower edge of said barrier is engaged by a catch 19 pivotally arranged on the front edge of the center one of the partitions 11, and which catch is released by a flexible cord 20 which extends to one side of the gate.

The gate is set for use by allowing the partitions 11 to swing downwardly into vertical planes so as to form stalls for the contestants, and said partitions are locked in their vertical positions by rotating the shaft 14 to bring the fingers 15 into engagement with the upper ends of said partitions, after which the barrier 18 is drawn downwardly into position in front of the partitions, and is so held by means of the latch 19. The contestants of the race now take their positions in the stalls between the partitions 11 facing the barrier, and when all of said contestants are in proper position, the race starter positioned alongside the track, pulls the cord 20 to disengage the catch 19, and the barrier instantly swings upward, owing to the power stored in the coil 17 of the spring 16, thus leaving the way clear for the contestants to start evenly. Immediately after the contestants have started, the shaft 14 is rotated to disengage the fingers 15 from the upper ends of the partitions 11, after which said partitions are swung upwardly into horizontal planes to be so held by the spring latches 12.

If the distance of the race requires that the contestants complete the circuit of the track and pass beneath the starting gate, the same may be elevated into a position shown by dotted lines in Fig. 3, by disengaging all of the pins 5 and lifting the posts 3 in the posts 1, and the gate may be locked in its elevated position by reëngaging the pins 5 in the upper sets of the apertures 2. When so positioned, the gate will in no way interfere with the contestants and the riders or drivers when passing beneath the gate a second time.

By disengaging the pins 5 from the posts, the gate can be readily removed from one point to another on a race course in order that the contestants may be started at different points thereon.

I claim:—

1. The combination with posts arranged in pairs at the sides of a race track, of a longitudinally adjustable frame supported by said posts and vertically adjustable thereon, partitions carried by said frame to form compartments for the race contestants, and a barrier arranged for operation on the front of said frame.

2. The combination with posts arranged in pairs at the sides of a race track, of a longitudinally adjustable frame supported by said posts and vertically adjustable thereon, partitions carried by said frame to form compartments for the race contestants, means whereby said partitions are locked in vertical positions, and a barrier arranged for operation on the front of said frame.

3. The combination with posts arranged in pairs at the sides of a race track, of a longitudinally adjustable frame supported by said posts and vertically adjustable thereon, partitions carried by said frame to form compartments for the race contestants, means whereby said partitions are locked in vertical positions, means whereby said partitions are held when swung into a horizontal plane, and a barrier arranged for operation on the front of said frame.

4. A race starting machine, constructed with a longitudinally adjustable frame, a series of transversely arranged partitions hinged in said frame, means whereby all of the partitions are locked when in vertical positions, means whereby said partitions are held when swung into a horizontal plane, and a spring actuated barrier arranged for operation on the front of said frame.

In testimony whereof, I have signed my name to this specification, in presence of two subscribing witnesses.

EMIL M. SPRICH.

Witnesses:
M. P. SMITH,
E. L. WALLACE.